(12) United States Patent
Henry, Jr. et al.

(10) Patent No.: US 11,453,343 B1
(45) Date of Patent: Sep. 27, 2022

(54) ROOF RAIL ASSEMBLY FOR A VEHICLE

(71) Applicant: Adrian Steel Company, Adrian, MI (US)

(72) Inventors: Mark Anthoney Henry, Jr., Adrian, MI (US); Joshua Michael Gerez, Tecumseh, MI (US); Joshua Merle Rogers, Manitou Beach, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 17/191,794

(22) Filed: Mar. 4, 2021

(51) Int. Cl.
*B60R 9/052* (2006.01)

(52) U.S. Cl.
CPC .................... B60R 9/052 (2013.01)

(58) Field of Classification Search
CPC ........ B60R 9/052; B60R 9/0423; B60R 9/048
USPC .................. 224/322–326, 329–330
See application file for complete search history.

(56) References Cited

U.S. PATENT DOCUMENTS

| | | | | |
|---|---|---|---|---|
| 3,677,451 | A | * | 7/1972 | Burland ............. B60R 9/048 224/330 |
| 4,616,771 | A | | 10/1986 | Heideman |
| 5,464,140 | A | | 11/1995 | Hill |
| 5,848,743 | A | * | 12/1998 | Derecktor ............. B60R 9/058 224/322 |
| 6,010,048 | A | * | 1/2000 | Settelmayer ............. B60R 9/045 224/322 |
| 6,050,467 | A | | 4/2000 | Drouillard et al. |
| 6,446,850 | B2 | * | 9/2002 | Ming-Shun ............. B60R 9/058 224/325 |
| 7,401,715 | B2 | * | 7/2008 | Edgerly ............. B60R 9/10 224/924 |
| 7,922,242 | B2 | | 4/2011 | Comfort et al. |
| 8,113,397 | B2 | | 2/2012 | Magnusson |
| 8,136,709 | B2 | | 3/2012 | Jeli et al. |
| 8,534,517 | B2 | | 9/2013 | Binder et al. |
| 8,974,160 | B2 | | 3/2015 | Bender |
| 9,308,872 | B2 | | 4/2016 | Huhn et al. |
| 9,371,041 | B2 | | 6/2016 | Almhill et al. |
| 9,409,527 | B2 | | 8/2016 | Hubbard |
| 9,566,913 | B2 | | 2/2017 | Sarges et al. |
| 9,783,119 | B1 | | 10/2017 | Lachance et al. |
| 10,005,403 | B2 | | 6/2018 | Calvin |
| 10,112,549 | B2 | | 10/2018 | Sutton |
| 10,160,394 | B2 | | 12/2018 | Kraeuter et al. |
| 10,442,363 | B2 | | 10/2019 | Ferman |
| 10,562,460 | B2 | | 2/2020 | Forgette et al. |
| 10,604,057 | B2 | | 3/2020 | Gettel |
| 10,710,511 | B2 | | 7/2020 | Lee et al. |

(Continued)

FOREIGN PATENT DOCUMENTS

| | | | | |
|---|---|---|---|---|
| CA | 2151681 | A | * 12/1996 | ............. B60R 9/045 |
| GB | 2543287 | A | * 4/2017 | ............... B60R 9/04 |

*Primary Examiner* — Scott T McNurlen
(74) *Attorney, Agent, or Firm* — Marshall & Melhorn, LLC

(57) ABSTRACT

A vehicle roof rail assembly may have a rail with an upper channel, a first channel below the upper channel and a second channel below the first channel. The assembly may also have a mounting portion with a channel portion adapted to be selectively located at least partially within the second channel and for selective sliding movement within the second channel. The mounting portion may also have a foot portion connected to the channel portion. A base portion of the foot portion may be adapted to selectively pivot.

20 Claims, 5 Drawing Sheets

(56) References Cited

U.S. PATENT DOCUMENTS

| | | |
|---|---|---|
| 2009/0020573 A1 | 1/2009 | Binder et al. |
| 2010/0038932 A1 | 2/2010 | Comfort et al. |
| 2014/0124551 A1* | 5/2014 | Condon .................... B60R 9/10 224/324 |
| 2016/0167590 A1* | 6/2016 | Sandberg ................ B60R 9/052 224/310 |
| 2018/0118127 A1* | 5/2018 | Wymore .................... B60R 9/04 |
| 2019/0077326 A1 | 3/2019 | Hawkins et al. |
| 2019/0118726 A1 | 4/2019 | Wacker et al. |
| 2019/0262880 A1 | 8/2019 | Wacker et al. |

* cited by examiner

ROOF RAIL ASSEMBLY FOR A VEHICLE

FIELD

One embodiment of a roof rail assembly for a vehicle is described and depicted. By way of example, the roof rail assembly may be used as a roof mounted ladder rack.

BACKGROUND

It is well-known to locate items for storage or transport on the exterior of a vehicle. In some cases, the items may be located on the roof of the vehicle. In these cases, a rack or rails maybe locate on the roof of the vehicle to receive the items thereon. The rack/rails can function to keep the transported items off of the vehicle finish and the rack/rails can provide a securing structure for the items.

Roof racks/rails in the prior art, however, have become complicated and their complicated nature drives up their manufacturing cost, which in turn drives up the cost to consumers. The complicated nature of the prior art racks can also provide additional failure modes. Further, the prior art racks have become heavy and unwieldy.

In view of at least the above-mentioned disadvantages associated with the prior art, it would be advantageous for a vehicle roof assembly to be simple and lightweight so that it was inexpensive, as well as easy to assemble, install and use, and to minimize the number of potential failure modes.

SUMMARY

In one aspect, a vehicle roof rail assembly may have a rail with an upper channel, a first channel vertically below the upper channel and a second channel vertically below the first channel. The assembly may also have a mounting portion having a channel portion adapted to be selectively located at least partially within the second channel and for selective sliding movement within the second channel. The mounting portion may also have a foot portion connected to the channel portion, where a base portion of the foot portion is adapted to selectively pivot.

In another aspect, longitudinal centerlines of the upper, first and second channels may be laterally aligned with one another.

In another aspect, the upper channel may have a base, first and second sub-channels extending along either side of the base, and first and second side channel walls, where the side channel walls at least partially laterally overlap the sub-channels.

In another aspect, the upper channel, the first channel and the second channel extend continuously along the longitudinal length of the rail.

In another aspect, the first channel may be connected to the second channel by a fastener channel that extends at least partially along the longitudinal length of the rail.

In another aspect, the fastener channel may have a narrower width than the first channel and the first channel has a narrower width than the second channel.

In another aspect, the first and second side walls may connect with first and second rail walls, respectively, where the first and second side walls and the first and second rails walls enclose respective hollow volumes.

In another aspect, the first and second fastener grooves may extend at least partially along the longitudinal length of the rail. The fastener grooves may also be laterally offset beside the first channel.

In another aspect, the rail may be extruded metal that is one piece, unitary and integrally formed.

In another aspect, a trim piece may be located between the first and second channel walls, where the trim piece may at least partially laterally and longitudinally cover and enclose the upper channel.

In another aspect, at least one fastener, having a head portion and a shank portion, may selectively connect the rail with the mounting portion. The head portion may be adapted to be selectively slidably mounted within the first channel, and said shank portion may be selectively slidably mounted within the fastener channel and selectively mounted in the mounting portion.

In another aspect, the foot portion may extend at an obtuse angle to the channel portion.

In another aspect, a base fastener may extend through the foot portion and the base to selectively connect the base to the foot portion.

In another aspect, a stop member may have an attachment end and an upright end. The attachment end may be selectively and slidably attached to the first channel via at least one fastener having a head that extends into said channel and a shank that extends through said fastener channel.

In another aspect, a roof rail assembly may have a rail, an upper channel, a first channel and a second channel stacked on one another. The assembly may also have first and second rail walls that each extend along the height of at least the upper and first channels. The assembly may also have a first mounting portion and a second mounting portion. Each mounting portion may have a channel portion adapted to be selectively slidably received within the second channel. Each mounting portion may have a base portion adapted to be secured to a vehicle.

In another aspect, first and second fastener grooves may be located between the first channel and the first and second rail walls.

In another aspect, the upper channel may have a width approximately equal to a width of the second channel.

In another aspect, the upper channel may be partially enclosed by a base, first and second sub-channels, and first and second side channel walls, where the first and second side channel walls may define between them a substantially constant width gap.

In another aspect, the first channel may be located vertically below the substantially constant width gap, extend co-axial therewith and be laterally bounded by first and second fastener grooves.

In another aspect, the first and second mounting portions may each have a foot portion where each foot portion may have two ribs separated by a gap, where the ribs of each respective foot portion may angle away from the channel portion to the base portion, where each of the base portions may be selectively pivotally attached to the ribs of the respective foot portions.

In another aspect, a roof rail assembly may have a rail having a first channel, a fastener channel and a second channel. The channels may be vertically aligned with one another. The assembly may also have a stop member, a side member and a mounting portion. The stop member and the side member may each have attachment portions, and the mounting portion may have a channel portion. The attachment portions and the channel portion may be adapted for selective slidable movement in the second channel via fasteners located in the attachment portions, the channel portion and which extend through the second channel, the fastener channel and into the first channel.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

It is to be understood that the device described herein may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Figure 1:
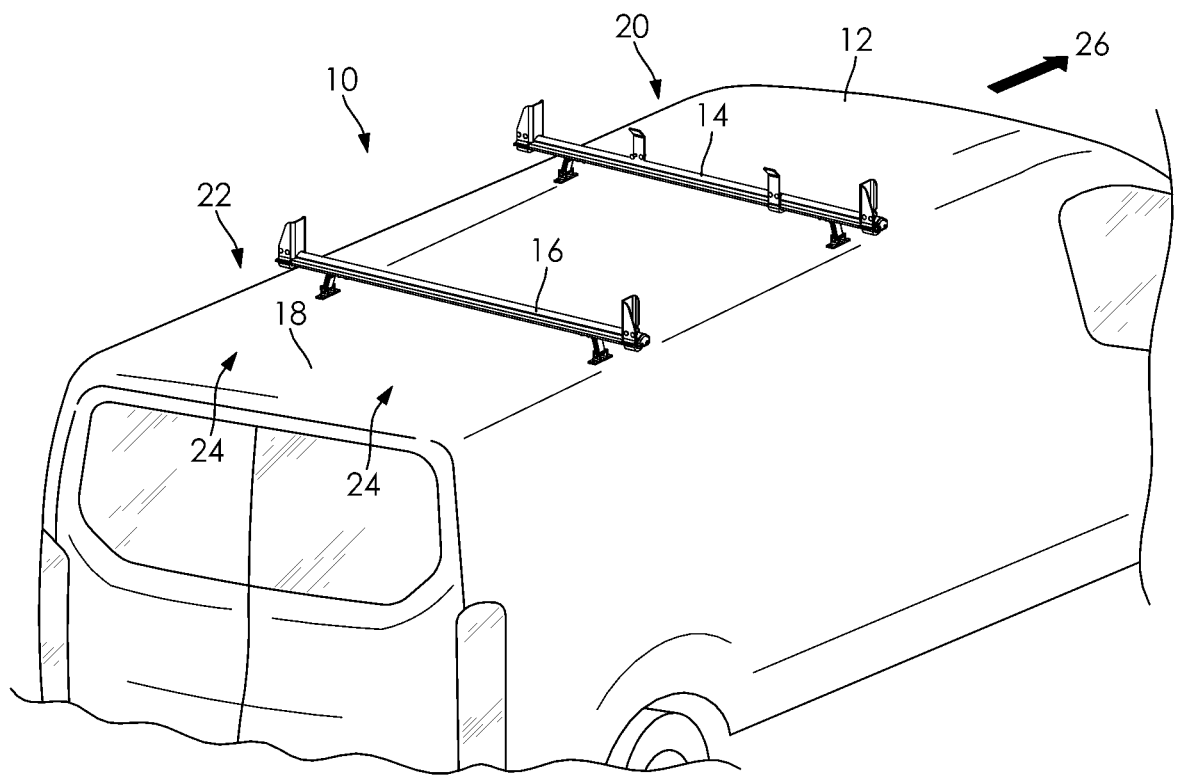
FIG. 1 schematically depicts one embodiment of a roof rail system on a vehicle.

Turning now to FIG. 1, one embodiment of a roof rail system 10 for a vehicle 12 is schematically depicted. The vehicle 12 in the figure is a cargo van type vehicle, but the system 10 may be used with other vehicles and it is not limited to cargo van type vehicles.

The roof rail system 10 may have at least one roof rail assembly. As shown in the depicted embedment in FIG. 1, first and second roof rail assemblies 14, 16 are shown. While two roof rails assemblies 14, 16 are shown in the embodiment, additional roof rail assemblies 14, 16 may be used.

The roof rail assemblies 14, 16 of the system 10 may be for a ladder rack this is designed to accommodate one or more ladders thereon. While ladders are mentioned, the system 10 is not limited for use with only ladders.

The roof rail assemblies 14, 16 may extend across at least a portion of the roof 18 of the vehicle 12. In some embodiments, like that shown in FIG. 1, the roof rail assemblies 14, 16 may extend across the majority of the width of the vehicle roof 18, although dimensions may vary to accommodate different vehicles. In this orientation, the roof rail assemblies 14, 16 may be located perpendicular to the primary vehicle direction.

The roof rail assemblies 14, 16 may be spaced apart from one another along the roof 18. In one example, the first roof rail assembly 14 may be located toward a front portion 20 of the vehicle 12 and the second roof rail assembly 16 may be located toward a rear portion of the vehicle 12. A predetermined distance may separate the first and second roof rail assemblies 14, 16. In some embodiments, the roof rail assemblies 14, 16 may be located along the sides 24 of the roof 18 of the vehicle 12. In other words, the roof rail assemblies 14, 16 may extend along, or be parallel with, the primary direction of vehicle 12 travel.

Figure 2:
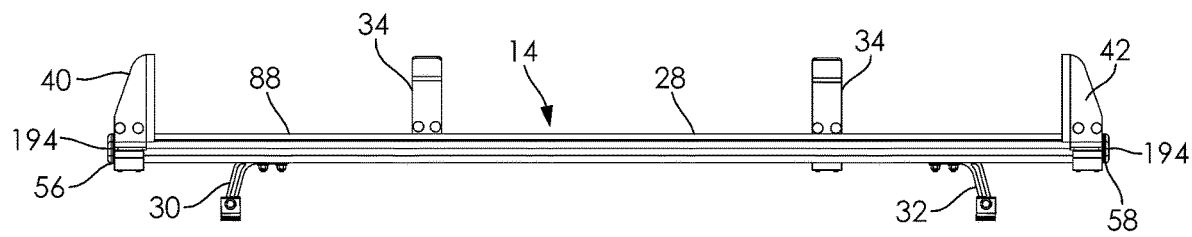
FIG. 2 depicts a side view of a roof rail assembly of the system from FIG. 1.

Turning now to FIG. 2, one embodiment of a one roof rail assembly 14 from the system 10 is schematically depicted. The roof rail assembly 14 in FIG. 2 may be such as the first roof rail assembly 14. The following is a description of the first roof rail assembly 14, which may apply in whole or in part of the second roof rail assembly 16.

The first roof rail assembly 14 may be comprised of a rail 28 and a first mounting portion 30. In some embodiments, such as depicted in FIG. 2, the roof rail assembly 14 may have first and second mounting portions 30, 32.

FIG. 2 also depicts one embodiment of a stop member 34 connected to the rail 28. The stop member 34 may be part of the roof rail assembly 14 or separate therefrom. The stop member 34 generally extends transverse the primary direction of the rail 28. In some embodiments, the stop member 34 may extend above the rail 28. In other embodiments, the stop member 34 may have a height that is approximately 2-5 times the height, or vertical thickness, of the rail 28.

The stop member 34 may have an upright portion 36 and an attachment portion 38. The attachment portion 38 may connect with the rail 28, as described below. The upright portion 36 may be adapted to prevent items located on the rail 28 from sliding off the rail 28. In one embodiment, the upright portion 36 may selectively engage with a ladder rail or ladder rung to prevent the ladder from sliding off the rail 28.

FIG. 2 depicts two stop members 34 connected to the rail 28 but a fewer number or greater number may be used. FIG. 1 only shows stop members 34 on the first rail assembly 14 but it is permissible to locate stop members 34 on the second rail assembly 16 as well for functioning in a similar manner for a similar purpose.

FIGS. 1 and 2 also depict one embodiment of first and second side members 40, 42 connected to the rail 28. The first and second side members 40, 42 may be part of the roof rail assembly 14 or separate therefrom.

The side members 40, 42 may each have an upright portion 44 and an attachment portion 46. The attachment portion 46 may connect with the rail 28, as described below. The upright portion 44 may be adapted to prevent items located on the rail 28 from sliding off the rail 28. In one embodiment, the upright portion 44 may selectively engage with a ladder rail or ladder rung to prevent the ladder from sliding off the rail 28.

The upright portions 44 generally extend transverse the primary direction of the rail 28. In some embodiments, the upright portions 44 may extend above the rail 28. In other embodiments, the upright portions 44 may have a height that is approximately 2-5 times the height, or vertical thickness, of the rail 28.

Figure 3:
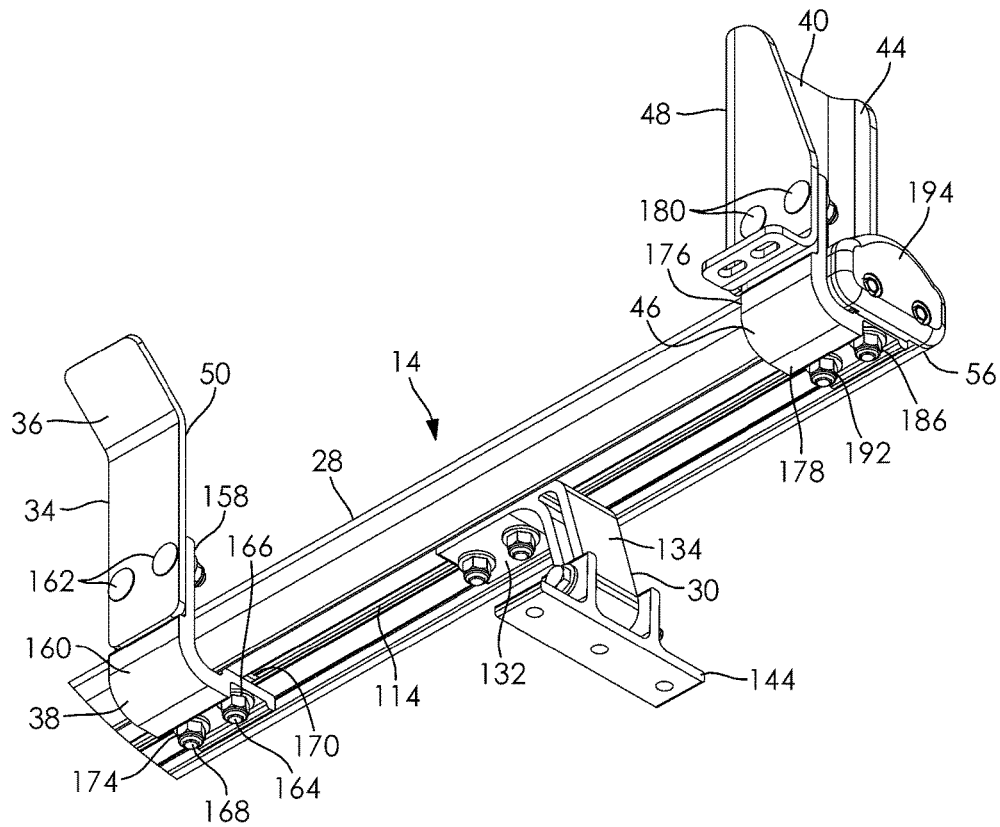
FIG. 3 depicts a partial perspective view of the roof rail assembly from FIG. 2.
Figure 4:
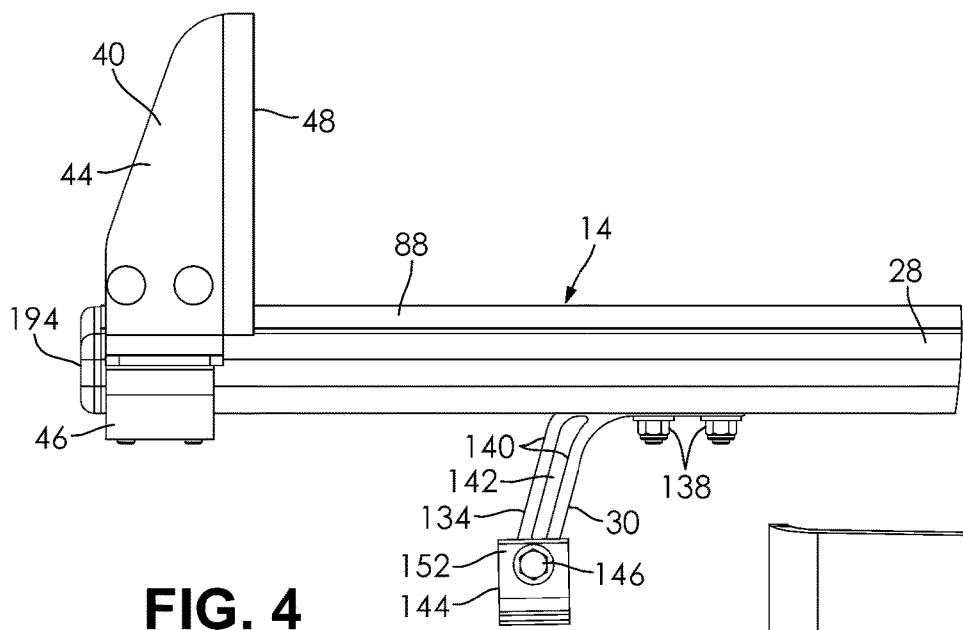
FIG. 4 depicts a partial side view of a portion of the roof rail assembly from FIG. 2.

With continued reference to FIGS. 1 and 2 and now FIG. 3, a contact surface 48 of the upright portion 44 of the side member 40 may be primarily oriented generally along the width of the rail 28. This may be contrasted with a contact surface 50 of the upright portion 36 for the stop member 34 which may be primarily oriented along the length of the rail 28. Thus, the two contact surfaces 48, 50 maybe oriented transverse one another.

The rail 28 may be such as an extruded metal rail. In the extruded embodiment, the rail 28 may be unitary, one-piece and integrally formed. If constructed of metal, the rail 28 may be such as aluminum or an alloy of aluminum, but other metals are permissible. Further, the rail 28 may also be constructed of non-metallic materials, such as plastic, fiberglass or composite materials.

An upper channel 52 may be located in an upper portion 54 of the rail 28. The upper channel 52 may extend continuously along the upper portion 54. In some embodiments, the upper channel 52 may longitudinally extend from a first end 56 to a second end 58 of the rail 28. The upper channel 52 may extend from the two ends 56, 58 with substantially the same cross-sectional profile or shape.

The upper channel 52 may be defined by a base 60, which may be substantially planar in both the lateral and longitudinal directions. First and second sub-channels 62, 64 may bound the lateral edges of the base 60. The two sub-channels 62, 64 may extend entirely along the longitudinal length of the base 60. The sub-channels 62, 64 may be co-planar with one another, but they may be below the plane of the base 60.

First and second side channel walls 66, 68 may extend from the first and second sub-channels 62, 64 respectively. In one embodiment, the first and second side channel walls 66, 68 may extend transversely upwardly from the first and second sub-channels 62, 64. The first and second side channel walls 66, 68 may extend continuously entirely along the longitudinal length of the first and second sub-channels 62, 64.

The first and second side channels 66, 68 may each have cantilevered portions 70, 72 that extend at least partially over the respective sub-channels 62, 64. The cantilevered portions 70, 72 may extend over the sub-channels 62, 64 to the same lateral extent as one another. Each cantilevered portion 70, 72 may have an inside surface 74, 78 and an outer surface 76 80 located opposite the inside surface 74, 78. Each inside surface 74, 78 may have a downwardly extending lip 82, 84 at least partially extending along the inside surface 74, 78. Preferably, the lips 82, 84 extend continuously entirely along the longitudinal length of each inside surface 74, 78.

In some embodiments, the cantilevered portions 70, 72 may define between them a constant width gap 86. The gap 86 may extend entirely along the longitudinal length of the rail 28.

It may be appreciated from the above that in some embodiments, the upper channel 52 may be partially enclosed by the base 60, the first and second sub-channels 62, 64, and the first and second side channel walls 66, 68.

Figure 5:
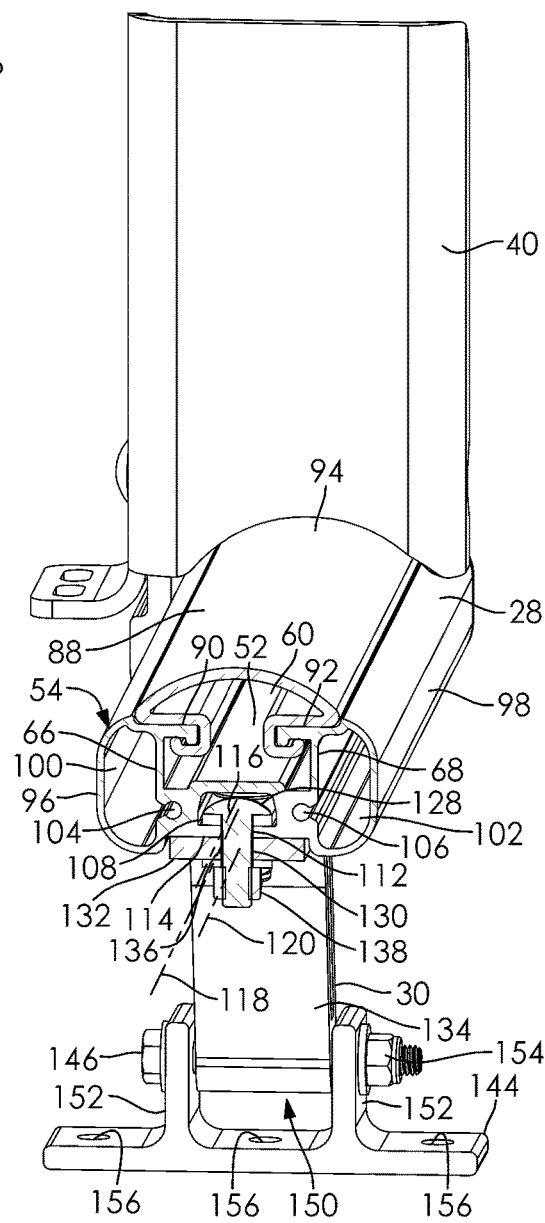
FIG. 5 depicts an end view of the roof rail assembly from FIG. 2.
Figure 6:
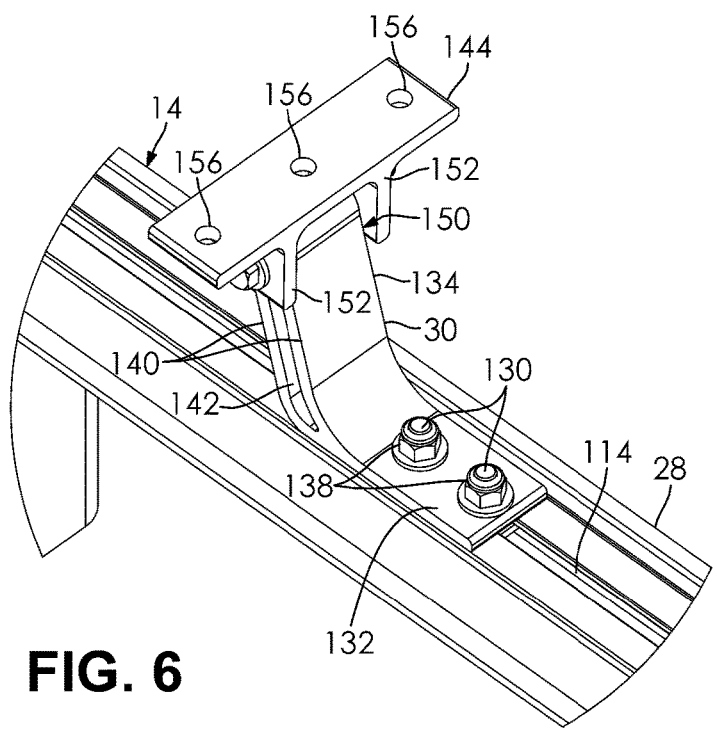
FIG. 6 depicts a lower perspective view of the roof rail assembly from FIG. 2.

A trim piece 88 may be connected to the rail 28; the trim piece 88 may be part of the rail assembly 14 or be separate therefrom. One embodiment of the trim piece 88 may be seen in FIGS. 2, 5 and 9, among others. The trim piece 88 may be selectively located in the gap 86 defined between the cantilevered portions 70, 72. The trim piece 88 may have a complementary shape to the cantilevered portions 70, 72, including the lips 82, 84 on each of the portions 70, 72.

In some embodiments, the trim piece 88 may at least partially wrap around the cantilevered portions 70, 72 and the lips 82, 84. In this regard, the trim piece 88 may have complementary shaped channels 90, 92 integrally formed therewith to receive the cantilevered portions 70, 72 and the lips 82, 84 therein.

In these embodiments, the channels 90, 92 may contact and at least partially enclose both the inside surfaces 74, 78 and the outer surfaces 76, 80 of the cantilevered portions 70, 72. In this way, the trim piece 88 may be connected to the rail 28. In some embodiments, the trim piece 88 may be longitudinally slidable within the gap 86.

The trim piece 88 may have an upper surface 94 connected to the channels 90, 92 where the upper surface 94 encloses the gap 86. The upper surface 94 may have an arc-shape so that moisture flows off of the upper surface 94 and does not enter the gap 86.

The trim piece 88 may be one-piece, integrally formed and unitary. The trim piece 88 may be constructed of a polymeric material including plastic, rubber and compounds of similar performance.

The rail 28 may also have first and second rails walls 96, 98. The first and second rail walls 96, 98 may be connected to the first and second side channels walls 66, 68. In one embodiment, the first and second rail walls 96, 98 may each define a curvilinear shape so that both define respective partial hemispheres.

The first and second rail walls 96, 98 may extend substantially continuously along the longitudinal length of the rail 28 with the same cross-sectional shape. In some embodiments, the first and second rail walls 96, 98 may have portions that extend parallel with, but which are laterally offset by first and second interior volumes 100, 102, the first and second side channel walls 100, 102. The first and second rail walls 96, 98 may have a height that extends from the tops of the first and second side channel walls 66, 68 to below first and second channels in the rail 28, which are described below.

Within the first and second interior volumes 100, 102, first and second fastener grooves 104, 105 may be located, respectively. In some embodiments, the fastener grooves 104, 106 may be vertically below the first and second sub channels 62, 64, respectively. The depicted embodiment of the fastener grooves 104, 106 may locate the fastener grooves 104, 106 between the first channel (described below) and the first and second rail walls 96, 98.

The first and second fastener grooves 104, 106 may extend substantially continuously along the longitudinal length of the rail 28 with the same cross-section. In one embodiment, the first and second fastener grooves 104, 106 may have a C-shaped cross section that opens into the interior volumes 100, 102. The first and second fastener grooves 104, 106 may have a lateral width that is equal to or less than a lateral width of the respective first and second sub-channels 62, 64.

The rail 28 may have a first channel 108. The first channel 108 may be located below, such as vertically below, the upper channel 52. In some embodiments, at least a portion of the first channel 108 may be vertically aligned with, such as generally coplanar with, the first and second fastener grooves 104, 106. In that embodiment, the first channel 108 may be laterally bounded by the first and second fastener grooves 104, 106. The first channel 108 may have a lateral width that is equal to or less than the lateral width of the base 60 of the upper channel 52. The first channel 108 may extend substantially continuously along the longitudinal length of the rail 28 with the same cross-section.

A base portion 110 of the first channel 108 may be in communication with a fastener channel 112. In some embodiments, the fastener channel 112 may be centered in the base portion 110 of the first channel 108. The fastener channel 112 may extend substantially continuously along the longitudinal length of the rail 28 with substantially the same cross-section. The fastener channel 112 may extend through the base portion 110 of the first channel 108 to a second channel 114. In some embodiments, the fastener channel 112 may have a lateral width that is less than the lateral width of the first channel 108 and the second channel 114.

The second channel 114 may be located vertically below the first channel 108 and be in communication with the first channel 108 through the fastener channel 112. Longitudinal centerlines 116, 118, 120 of the first channel 108, the fastener channel 122, 124 and the second channel 114 may be laterally aligned with one another. Bottom portions 122, 124 of the first and second rail walls 96, 98 may define the second channel 114.

The second channel 114 may have a lateral width that is the same or that approximates the lateral width of the base 60 and first and second sub-channels 62, 64 of the upper channel 52. In some embodiments, the vertical height of the second channel 114 may be approximately that of the fastener channel 114. It may be that the first channel 108 has a greater vertical height compared with the fastener channel 112 or the second channel 114. The second channel 114 may extend substantially continuously along the longitudinal length of the rail 28 with substantially the same cross-section.

At least one fastener 128 may be located at least partially in the upper channel 52, the first channel 108 and the second channel 114. In some embodiments, the fastener 128 may have a head portion 128 and a shank portion 130. The head portion 128 may be located in the upper channel 52 while the shank portion 130 may be located in the first channel 108 and the second channel 114. The head portion 128 may be wider than the fastener channel 112, which prevents the fastener 128 from falling through the fastener channel 112. Instead, the first channel 108 functions as a track along which the head portion 128 may selectively slide along and within. Similarly, the fastener channel 112 functions as a track along which the shank portion 130 may selectively slide along and within.

Turning now to FIG. 3-6, but not excluding the others, one embodiment of a mounting portion 30, which may be part of the roof rail assembly 14 or separate therefrom, is depicted. In some embodiments, the mounting portion 30 may have a channel portion 132 and a foot portion 134.

The channel portion 132 may be adapted to be selectively located at least partially within the second channel 114. In this regard, the channel portion 132 may have a similar shape and size to the second channel 114. In one embodiment, the second channel 114 may have at least a partially rectangular cross-sectional shape. The channel portion 132 may also have a partially rectangular cross-sectional shape. The channel portion 132 may have a smaller lateral width compared to the second channel 114 so that the channel portion 132 may fit within the second channel 114. Further, the channel portion 132 may be located within the second channel 114 anywhere along the longitudinal length of the second channel 114. In some embodiments, the channel portion 132 may be selectively slid within the second channel 114. In these cases, the channel portion 132 may extend in a parallel direction to the primary direction of the rail 28.

The fastener 128 may extend through an aperture 136 in the channel portion 132. In some embodiments, as shown in the figures, two fasteners 128 may be located through the channel portion 132, the fastener channel 112 and the second channel 114. Nuts 138 may be located on the shank portion 130 of the fasteners 128 extending through the channel portion 132 to secure the fasteners 128, and thus the channel portions 132, in place in a desired position along the second channel 114 and the rail 28.

In some embodiments, the mounting portion 30 maybe unitary, integrally formed and one-piece with the channel portion 132. The mounting portion 30 may extend at a downward angle with respect to the channel portion 132. In some embodiments, the mounting portion 30 may form an obtuse angle with the channel portion 132.

The mounting portion 30 may be comprised of two parallel sections of material 140 that are separated from one another by a gap 142. In other embodiments, the mounting portion 30 may be a single piece.

The foot portion 134 may also be comprised of a base portion 144. The base portion 144 may be selectively pivotable with respect to the mounting portion 30. As may be seen in at least FIGS. 3-7, a fastener 146 may extend through a fastener aperture 148 in a lower portion 150 of the foot portion 134. The fastener 146 may also extend through two ears 152 extending from the base portion 144. A nut 154 may be located on one end of the fastener 146 extending through one of the ears 152. The nut 154 may be loosened, the base portion 144 pivoted at a desired angle with respect to the mounting portion 30, and then the nut 154 may be tightened to secure the base portion 144 at the desired angle to the mounting portion 30. In this way, the base portion 144 may be adjusted to match the pitch or angle of the roof 18 of the vehicle 12.

The base portion 144 may have fastener apertures 156 extending therethrough. Fasteners (not shown) maybe located through the aperture 156 and into the roof 18, or a roof mounted structure, to secure the foot portion 134, and thus, the rail 28, thereto.

Figure 7:
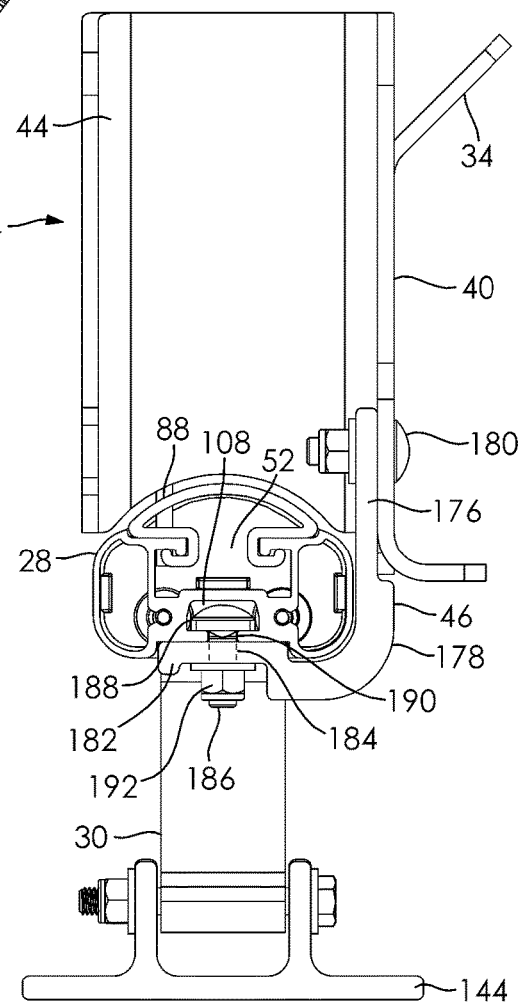
FIG. 7 depicts an end view of the roof rail assembly from FIG. 2.
Figure 8:
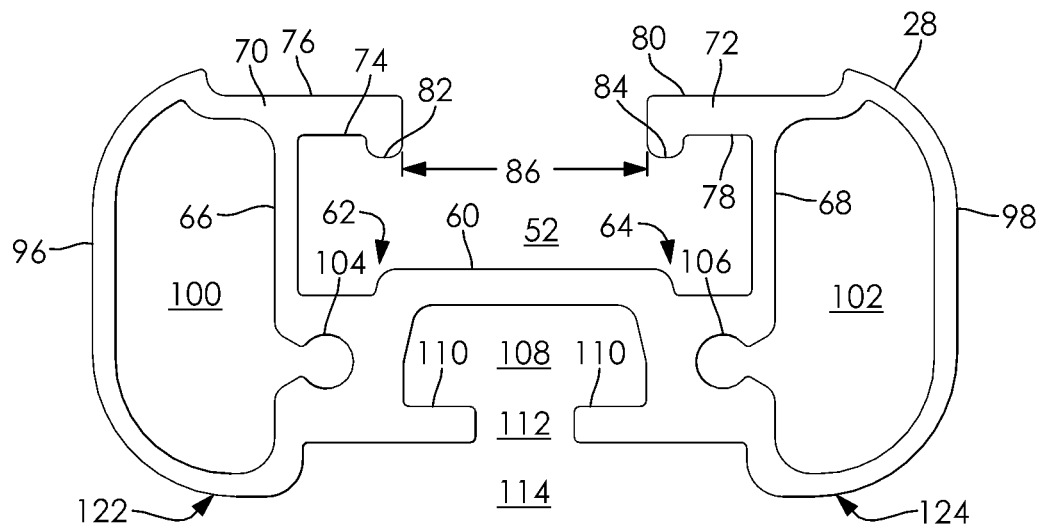
FIG. 8 depict an end view of a roof rail of the assembly from FIG. 2.

Looking now at least at FIGS. 3 and 7, one embodiment of a connection between one stop member 34 and the rail 28 is depicted. In this exemplary embodiment, the attachment portion 38 of the stop member 34 may have an upper and a lower portion 158, 160. The upper portion 158 may be connected to the upright portion 36 of the stop member 34. The connection may be through mechanical fasteners 162 and/or welding. The lower portion 160 of the stop member 34 may have a complementary shape to the first or second rail wall 96 or 98 (depending on which side of the rail 28 the stop member 34 is located against). The lower portion 160 of the stop member 34 may also have a channel portion 164. The channel portion 164 may have at least a partially rectangular cross section, which is best seen in FIG. 7. The channel portion 164 preferably has a complementary shape to at least a portion second channel 114. In some embodiments, the channel portion 164 may be at least partially located within the second channel 114. The channel portion 164 may be adapted to fit within the second channel 114 anywhere along the longitudinal length of the channel portion 164.

The channel portion 164 may have one or more fastener apertures 166 extending therethrough. A fastener 168 may be located in the aperture 166. The fastener 168 may be the same or similar to the fastener 126 that secures the mounting portion 30 to the rail 28. Thus, the fastener 168 may have a head portion 170 and a shank portion 172. The head portion 170 may be located within the second channel 114 while the shank portion 172 may be located through the fastener channel 112 as well as the lower portion 160 of the stop member 34. Until a nut 174 is located on the fastener 168 and tightened against the lower portion 160, the head portion 170 of the fastener 168 may slide along and within the second channel 114. This permits the stop member 34 to be located anywhere along the longitudinal length of the rail 28.

Figure 9:
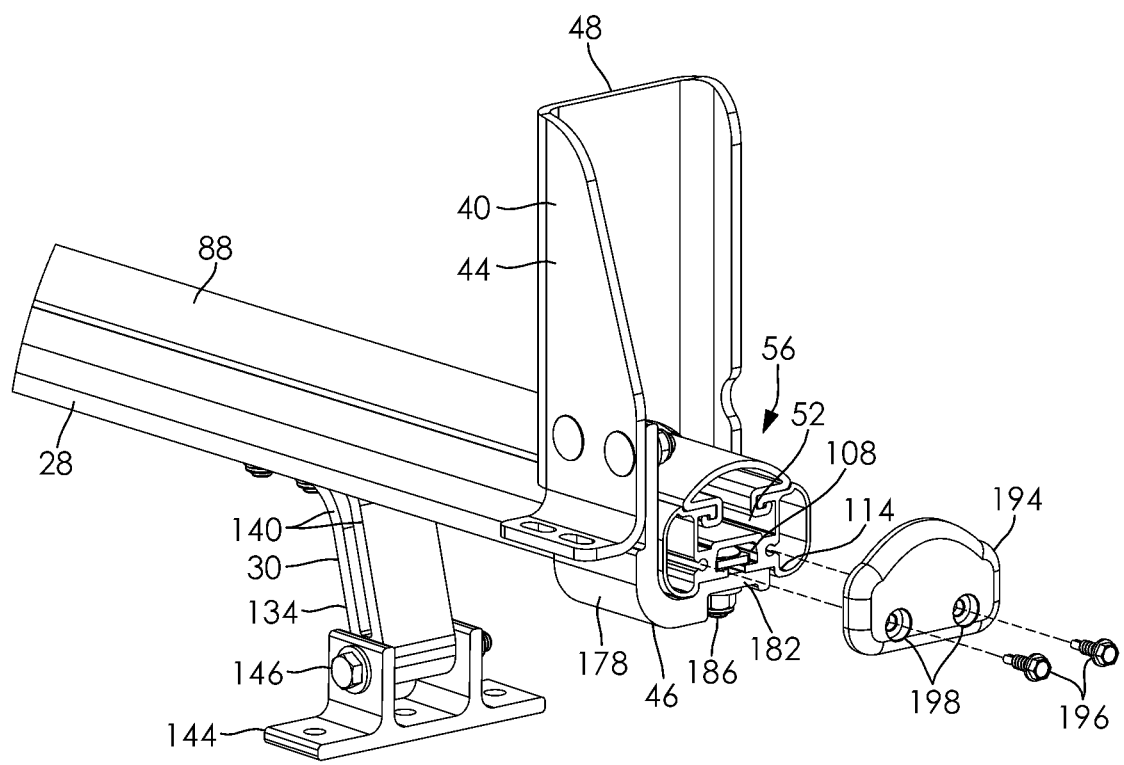
FIG. 9 depicts a partial perspective view of the roof rail assembly from FIG. 2.

As can be appreciated from FIGS. 3 and 9, the side members 40, 42 may be similarly adjusted. In this exemplary embodiment, the attachment portion 46 of the side member 40 may have an upper and a lower portion 176, 178. The upper portion 176 may be connected to the upright portion 44 of the side member 40. The connection may be through mechanical fasteners 180 and/or welding. The lower portion 178 of the side member 40 may have a complementary shape to the first or second rail wall 96, 98 (depending on which side of the rail 28 the side member 40 is located against). The lower portion 178 of the side member 40 may also have a channel portion 182. The channel portion 182 may have at least a partially rectangular cross section, which is best seen in FIG. 9. The channel portion 182 preferably has a complementary shape to at least a portion second channel 114. In some embodiments, the channel portion 182 may be at least partially located within the second channel 114. The channel portion 182 may be adapted to fit within the second channel 114 anywhere along the longitudinal length of the channel portion 182.

The channel portion 182 may have one or more fastener apertures 184 extending therethrough. A fastener 186 may be located in the aperture 184. The fastener 186 may be the same or similar to the fastener 128 that secures the mounting portion 30 to the rail 28. Thus, the fastener 186 may have a head portion 188 and a shank portion 190. The head portion 188 may be located within the second channel 114 while the shank portion 190 may be located through the fastener channel 112 as well as the lower portion 178 of the side member 40. Until a nut 192 is located on the fastener 186 and tightened against the lower portion 178, the head portion 188 of the fastener 180 may slide along and within the second channel 114. This permits the side member 40 to be located anywhere along the longitudinal length of the rail 28.

With continued reference to FIGS. 3 and 9, one embodiment of an end cap 194 is schematically depicted. An end cap 194 may be located on each of the first end 56 and the second end 58 of the rail 28. The end cap 194 may cover and enclose the longitudinal first and second ends 56, 58 of the rail 28. In other words, each end cap 194 may cover, enclose and terminate the longitudinal ends 56, 58 of the upper channel 52, the first channel 108 and the second channel 114, as well as the first and second interior volumes 100, 102 defined by the first and second rail walls 96, 98.

Each end cap 194 may be selectively connected to the rail 28. In one embodiment, shown in FIGS. 3 and 9, the end cap 194 may be secured to the rail 28 such as with mechanical fasteners 196. In the depicted embodiment, two screws 196 may be located in two apertures 198 in each end cap 194. When an end cap 194 is located on an end 56, 58 of the rail 28, the apertures 198 align with the fasteners grooves 104, 106 in the rail 28. The mechanical fasteners 196 extend through the apertures 198 in the end caps 194 where they seat within the fastener grooves 104, 106.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A vehicle roof rail assembly, comprising:
a rail having an upper channel, a first channel vertically below the upper channel and a second channel vertically below the first channel;
a mounting portion having a channel portion adapted to be selectively located at least partially within said second channel and for selective sliding movement within the second channel, said mounting portion also having a foot portion connected to said channel portion via two parallel, spaced part plates, wherein a base portion of said foot portion is adapted to selectively pivot;
a stop member and a side member each having attachment portions comprised of plates at least partially wrapped around the first and second channels, said attachment portion plates having portions oriented transverse to said plates of said mounting portions,
wherein said attachment portions and said channel portion are adapted for selective slidable movement with respect to said second channel via fasteners located in said attachment portions and said channel portion and which extend through said second channel and into said first channel through a fastener channel connecting the first and second channels,
wherein said attachment portions each have channel portions, wherein said channel portions of said attachment portions and said mounting portions each have upper portions with polygonal shapes complementary in shape to said second channel, wherein said upper portions are coplanar with one another and at least partially reside within the second channel.

2. The roof rail assembly of claim 1, wherein longitudinal centerlines of said upper, first and second channels are laterally aligned with one another.

3. The roof rail assembly of claim 1, wherein said upper channel has a base, first and second sub-channels extending along either side of the base, and first and second side channel walls, wherein said side channel walls at least partially laterally overlap said sub-channels.

4. The roof rail assembly of claim 3, wherein a trim piece is located between said first and second channel walls and at least partially laterally and longitudinally covers and encloses said upper channel.

5. The roof rail assembly of claim 1, wherein said upper channel, said first channel and said second channel extend continuously along the longitudinal length of said rail.

6. The roof rail assembly of claim 1, wherein said first channel is connected to said second channel by said fastener channel that extends at least partially along the longitudinal length of the rail.

7. The roof rail assembly of claim 6, wherein said fastener channel has a narrower width than said first channel and said first channel has a narrower width than said second channel.

8. The roof rail assembly of claim 1, wherein first and second side walls connect with first and second rail walls, respectively, wherein said first and second side walls and said first and second rails walls enclose respective hollow volumes.

9. The roof rail assembly of claim 1, wherein at least one fastener, comprising a head portion and a shank portion, selectively connects said rail with said mounting portion, wherein said head portion is adapted to be selectively slidably mounted within said first channel, and said shank portion is selectively slidably mounted within said fastener channel and selectively mounted in said mounting portion.

10. The roof rail assembly of claim 1, wherein said foot portion extends at an obtuse angle to said channel portion.

11. The roof rail assembly of claim 1, wherein a base fastener extends through said foot portion and said base portion to selectively connect said base to said foot portion.

12. The roof rail assembly of claim 1, further comprising a stop member having an attachment end and an upright end, wherein said attachment end is selectively and slidably attached to said first channel via at least one fastener having a head that extends into said first channel and a shank that extends through said fastener channel.

13. A roof rail assembly, comprising:
a rail, comprising:

an upper channel, a first channel and a second channel stacked on one another;

first and second rail walls that each extend along the height of at least the upper and first channels;

a first mounting portion and a second mounting portion, wherein each mounting portion has a channel portion adapted to be selectively slidably received within the second channel, and wherein each mounting portion has a base portion connected to the channel portion via two parallel, spaced apart plates adapted to be secured to a vehicle; and a stop member and a side member each having attachment portions comprised of plates at least partially wrapped around the first and second channels, said attachment portion plates having portions oriented transverse to said plates of said mounting portions, wherein said attachment portions and said channel portion are adapted for selective slidable movement with respect to said second channel via fasteners located in said attachment portions and said channel portion and which extend through said second channel and into said first channel through a fastener channel connecting the first and second channels, wherein said attachment portions each have channel portions, wherein said channel portions of said attachment portions and said mounting portions each have upper portions with polygonal shapes complementary in shape to said second channel, wherein said upper portions are coplanar with one another and at least partially reside within the second channel.

14. The roof rail assembly of claim 13, wherein first and second fastener grooves are located between said first channel and said first and second rail walls.

15. The roof rail assembly of claim 13, wherein said upper channel has a width equal to a width of at least a portion said second channel.

16. The roof rail assembly of claim 13, wherein said upper channel is partially enclosed by a base, first and second sub-channels, and first and second side channel walls, wherein said first and second side channel walls define between them a substantially constant width gap.

17. The roof rail assembly of claim 16, wherein said first channel is located vertically below the substantially constant width gap, extends co-axial therewith and is laterally bounded by first and second fastener grooves.

18. The roof rail assembly of claim 13, wherein said first and second mounting portions each have a foot portion where each foot portion is comprised of said two plates separated by a gap, wherein said plates of each respective foot portion angle away from the channel portion to the base portion, wherein each of said base portions are selectively pivotally attached to said plates of the respective foot portions.

19. A roof rail assembly, comprising:

a rail having a first channel, a fastener channel and a second channel, wherein said channels are vertically aligned with one another; and a stop member, a side member and a mounting portion, wherein said stop member and said side member each have attachment portions, and said mounting portion has a channel portion, wherein a portion of said attachment portions and said channel portion are adapted for selective slidable movement in said second channel via fasteners located in said attachment portions and said channel portion and which extend through said second channel, said fastener channel and into said first channel, wherein said attachment portions are J-shaped with a substantially vertical leg and a substantially horizontal leg, wherein said substantially horizontal leg at least partially comprises a channel portion of the attachment portions, said channel portion of the attachment portions has an upper portion with a complementary polygonal shape to said second channel and which at least partially resides within the second channel, wherein said substantially horizontal leg transitions to said substantially vertical leg through a curved transition portion so that said J-shaped attachment portions have a complementary shape to a curved outer rail side wall.

20. The roof rail assembly of claim 19, wherein said attachment portions of said stop member and said side member have the same shape and size.

* * * * *